3,198,538
DOLLY
Charles P. Nowell, 1675 Glen Ave., Apt. 1,
Anaheim, Calif.
Filed Jan. 20, 1964, Ser. No. 338,642
6 Claims. (Cl. 280—35)

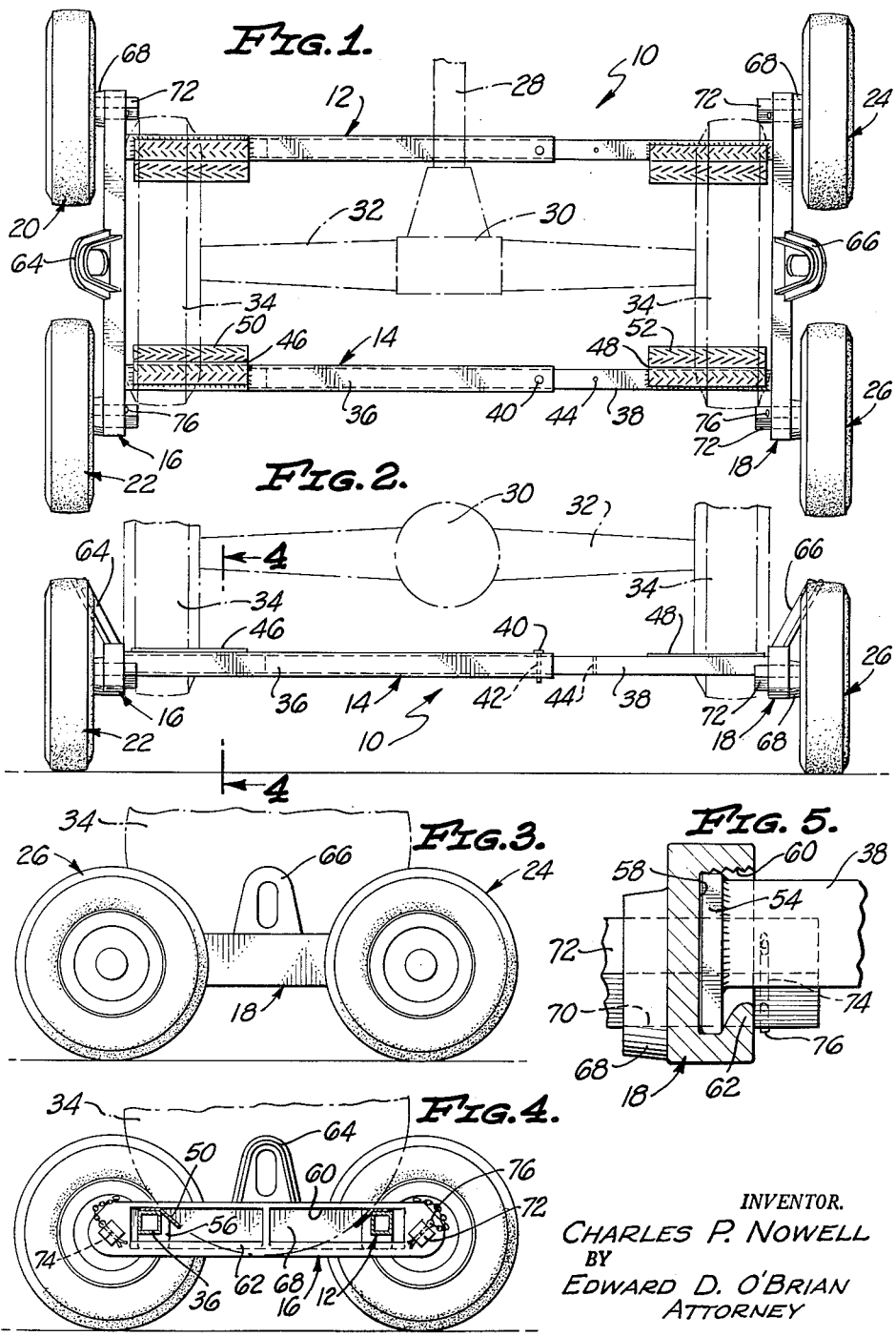

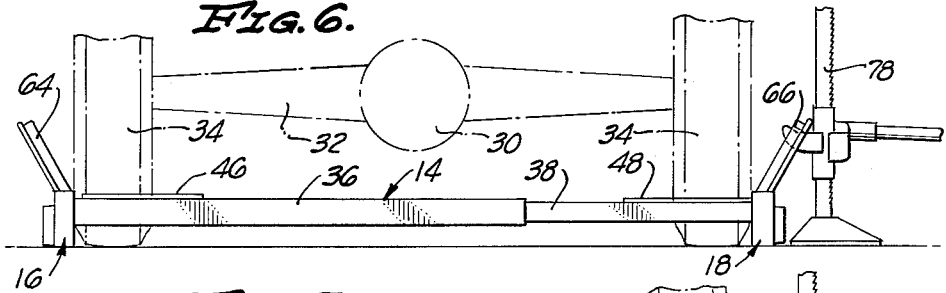
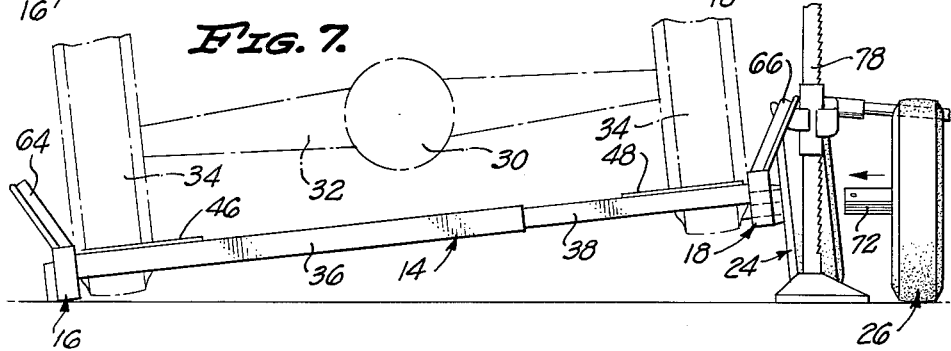
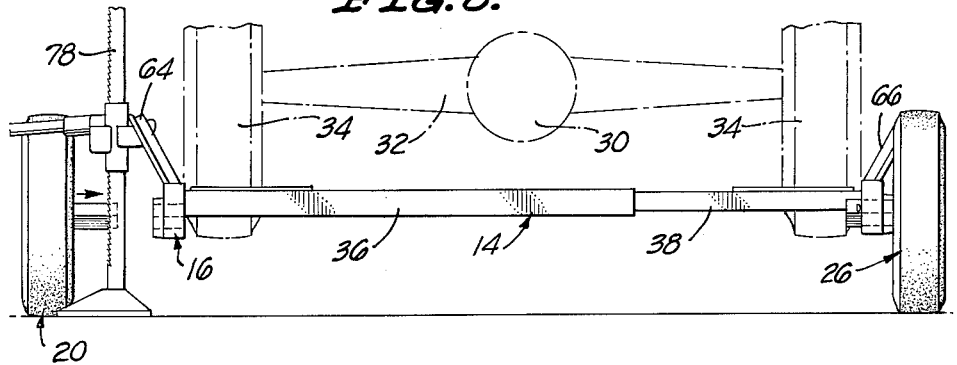
INVENTOR.
CHARLES P. NOWELL
BY
EDWARD D. O'BRIAN
ATTORNEY United States Patent Office 3,198,538
Patented Aug. 3, 1965

This invention is directed to a dolly particularly adapted for the support and conveyance of disabled motor vehicles.

The modern highway motor vehicle is a highly refined piece of technological equipment evolved through many years of development to a point where speed, comfort and convenience, particularly in the new models, has surpassed that which has previously been obtainable. This technological advance has brought many improvements and changes, but not all of such changes and improvements have been desirable in all cases. One of the areas of advance is the extensive use of automatic transmissions in passenger automobiles. These transmissions improve the ease of driving and the comfort of passengers as well as provide superior performance in many cases. One disadvantage of automatic transmissions is, however, that an automobile vehicle cannot be towed with the engine standing idle and the output end of the transmission in motion, for in such circumstances inadequate lubrication of the transmission ensues and permanent damage may result therefrom. Furthermore, it is extremely difficult and dangerous to lift the rear end of the passenger automobile by means of a tow truck and tow the passenger automobile with the front wheels in ground engagement. The difficulty here arises from the fact that the dirigible front wheels cannot be safely held in one position for straight line towing. The dirigible front wheels have a tendency to wander from side to side with consequent swaying and very real chance of having the vehicle go out of control. Accordingly it is now customary to use four wheel dollies under either the front or the rear end of the disabled vehicle. In view of the greater stability of the rear wheels, the dolly is commonly put thereunder. Prior art dollies are commonly provided for four wheels and saddles in which the vehicle wheels rest. Such dollies are bulky and heavy, and are particularly hard to manage.

Such prior art dollies must be put in use by having the tow truck lift the rear of the disabled automobile while the dolly is manually placed thereunder. Then the tow truck places the disabled vehicle on the dolly, drives around to the front end of the disabled vehicle, picks it up, and is ready to tow. In considering the tow truck motions during this period, it can be seen that dangerous conditions ensue. When a car is disabled along the highway, the tow truck normally pulls in front of it so as to better dispense its smaller services. When it is found that the disabled vehicle must be towed away, the tow truck must turn around and go to the rear of the disabled vehicle in a back-to-back relationship while the dolly is installed. Thereupon the tow truck must go around to the front end again, for the lifting of the front end and towing of the disabled vehicle, now on the dolly. On heavily traveled highways such maneuverings are highly dangerous, as well as extremely time consuming. Thus, such dollies for disabled automotive vehicles have not been fully accepted by the trade.

Accordingly, it is an object of this invention to provide a dolly for a disabled automotive vehicle with the dolly having such characteristics that it can be easily handled and positioned beneath such an automotive vehicle without the need for lifting by a tow truck.

It is another object of this invention to provide a dolly for disabled automotive vehicle which dolly is disassemblable so that the individual pieces in the disassembled condition can readily be handled by one man without strain.

It is another object of this invention to provide a disassemblable dolly for disabled vehicles of such dimension and construction that the portions of the dolly required beneath the automotive vehicle may be manually placed therebelow, when there is minimum clearance beneath the disabled vehicle, and the dolly portions may be assembled to successfully raise one side and then the other side of the disabled vehicle with minimum time consumption and minimum effort without the use of tow truck lifting facilities.

It is another object of this invention to provide a dolly of simple, economic and sturdy construction which may be readily and economically used by one man.

Other objects and advantages of this invention will become apparent from the study of the following portion of the specification, the claims and the attached drawings in which:

FIG. 1 is a top plan view of the dolly of this invention in the assembled condition;
FIG. 2 is a rear elevation thereof;
FIG. 3 is a side elevation thereof;
FIG. 4 is a section taken along the line 4—4 of FIG. 2;
FIG. 5 is an enlarged detailed section showing how the cross bars assemble and lock into the end frames of the dolly of this invention;
FIG. 6 is a rear elevation thereof showing the dolly in partially assembled form and in condition to lift a disabled vehicle;
FIG. 7 is a view similar to the view of FIG. 6 wherein one side of the automotive vehicle and dolly are lifted;
FIG. 8 is a view similar to FIG. 6 wherein both sides of the dolly are raised.

As an aid to understanding this invention, it can be stated in essentially summary form that it relates to a dolly for transportation of disabled automotive passenger vehicles. It is desirable in many instances of disabled passenger vehicles to raise the front end of such vehicle and tow them by means of appropriate support on the tow truck and to raise the rear ends of such vehicles and support them on dollies. The dolly of this invention is a demountable structure so that it is not necessary to raise the rear end of the diabled vehicle to position the dolly therebelow. The dolly comprises cross pieces which extend across the disabled vehicle and engage upon the wheels thereof, or such structure as there is remaining adjacent the wheel position. After the cross pieces are so positioned by thrusting them beneath the disabled vehicle, they are placed into and locked within end frames. One frame on each side of the disabled vehicle accepts and locks the corresponding ends of the cross pieces so that one such frame is positioned on each side of the vehicle. Each frame is provided with suitable jacking lug satisfactory for engagement by a conventional bumper jack. The frame on one side of the car is lifted and wheels and axles are installed onto the frame. Thereupon the bumper jack is lowered to permit that frame to rest upon its newly assembled wheels. Then the bumper jack is placed in the jacking lug of the opposite frame and the other side of the frame and associated ends of the cross pieces are raised so that wheels may be inserted in that frame. Upon insertion of the wheels, that frame is lowered and the dolly is ready to permit towing of the disabled vehicle. The locking of the cross pieces into the end frames and the wheel axles into the end frames provides rigidity and alignment during towing. The dolly is similarly removed when the disabled vehicle reaches its destination.

A better understanding of the dolly of this invention will be obtained upon a study of the following portion of the specificaiton where the drawings are referred to in detail. Referring now to FIGS. 1 and 2, the dolly is generally indicated at 10. As seen therein, the dolly comprises cross bars 12 and 14 which extend transversely thereof, end frames 16 and 18 into which the cross bars 12 and 14 are locked and wheel assemblies 20, 22, 24 and 26 which are mounted on end frames 16 and 18. As can be seen from FIGS. 1 and 2, these parts are assembled into a dolly suitable for the support and transport of an automotive vehicle. For purposes of illustration, the wheel axle of a passenger type automotive vehicle is shown in dotted lines. This portion comprises drive shaft 28, differential 30, rear axle 32 and wheels 34.

Considering cross bar 14 in more detail, it is understood that cross bar 12 is symmetrically identical with it. Cross bar 14 is primarily comprised of two bars, one of which telescopes into the other. The larger bar 36 is in the form of a square tube into which long bar 38 is telescopically fitted. For purposes of weight conservation, the small bar 38 is also of square tubular form and both bars 36 and 38 have suitable dimensions and wall thickness to provide strength commensurate to their purpose. In order to establish different fixed lengths of the cross bar 14, the bars 36 and 38 are secured to each other by means of pin 40 passing through holes 42 which are in alignment through both of the bars. In order to provide different overall width of the instant dolly, additional holes 44 are provided at appropriate places. The holes 42 and 44 are positioned in such a manner that the overall width of the dolly can be arranged suitable for transportation of standard size passenger automotive vehicles, for compact cars, and for smaller cars. Furthermore, should the dolly 10 be designed with sufficient structural strength to be suitable for transportation of larger highway equipment, additional holes 44 can be furnished to provide the proper width for such equipment.

Tread pad 46 is secured to the top of bar 36 near its outward end, and tread pad 48 is similarly secured to bar 38 adjacent its outward end. These pads are secured to these bars in permanent fashion preferably by welding or the like, and are suitable formed with downwardly and inwardly extending skirts 50 and 52, respectively, having suitable shape to support the wheels 34 of the vehicle carried upon dolly 10, see FIG. 4.

As is best seen in FIGS. 4 and 5, locking shoes are secured to the ends of bars 36 and 38. In FIG. 5, locking shoe 54 is secured to the end of bar 38 and in FIG. 4 locking shoe 56 is secured to the end of bar 36. These locking shoes are of the same size and generally square configuration, and are preferably made out of square steel plate securely welded to the ends of the bars with the plane of the shoes generally at right angles to the length of the bars. The locking shoes are positioned at the ends of the bars in such a manner that the outside edge of the bars are extensive with the outside edge of the locking shoes and the top of the bars are just below the top edge of the locking shoes. While the locking shoes 54 and 56 are shown as being substantially square, they may be longer in the fore and aft direction of the dolly 10, if desired. The locking shoes 54 and 56 are provided on the cross bars 12 and 14 to removably lock the cross bars into the end frames 16 and 18, as will become more apparent hereinafter.

End frame 16 is seen in FIG. 4 and end frame 18 is seen in FIG. 5. These end frames are identical, and accordingly are described together. End frames 16 and 18 are basically of rectangular cross section and are preferably made of light, strong castable material such as high strength aluminum-magnesium alloys. The end frames 16 and 18 are cast with a generally rectangular recess 58, extending generally along the length of the frames. The recess 58 has a roughened or corrugated top 60 and is provided with a lip 62 partly closing the recess 54 at the bottom of the inner face of frames 16 and 18. The recess 54, with its corrugation 60 and lip 62 is dimensioned in such a manner that the locking shoes 54 and 56 may be positioned therein by placing the bottom of the locking shoes behind the lips 62 and rocking the frames upward. Furthermore, the dimensions are such that when the locking shoes are positioned in their recesses, rotation of the cross bars is prevented. As can be seen in FIG. 5, when a moment is applied to end frame 18, the moment only serves to lock the frame more tightly upon the locking shoes and thus to the cross bars. Jacking lugs 64 and 66 are cast integrally with end frames 16 and 18, respectively, and are of such configuration and positioned in such a manner that a standard automobile bumper jack can be used in association therewith to raise the end frames 16 and 18, sequentially, and at the same time apply an appropriate torque to lock the end frames on the cross bars. Also integral with the end frame castings are axle bosses 68. Extending through the axle bosses 68 are axle bearings 70 which are in the form of square holes. The intersecting planar walls of the square axle bearing holes 70 are arranged with their corners in a vertical position as is seen in FIG. 4.

Wheel assemblies 20, 22, 24, and 26 are identical in structure and include a tire, a wheel, and an appropriate wheel mounting bearings. The wheel bearings support the wheel upon axle 72 which is appropriately square to fit within the axle bearing 70. A hole 74 is provided through each of the axles 72 in such a position that when the wheel assemblies are properly positioned upon the end frames, the holes 74 are exposed inside the end frames. Retaining means, such as cotter keys 76, are then thrust through the holes 74 to maintain the wheel assemblies upon the wheel frames. If desired, the cotter keys 76 may be conserved and held always ready by chaining them to the end frames, as seen in FIG. 4.

The sequential assembly of the dolly and raising of a disabled automotive vehicle is sequentially shown in FIGS. 6, 7, and 8. For the purpose of describing the manner which the dolly is used in conjunction with such a disabled automotive vehicle, it is assumed that the vehicle is a passenger car having a thoroughly disabled engine and is equipped with automatic transmission. This is merely illustrative, however, for the dolly is useful in any type of breakdown where it is desirable that the vehicle to be serviced be completely removed from contact with the roadway. Such is the case in severe accidents where substantial structural portions of the vehicle are disabled or destroyed, as well as wheel, axle or bearing difficulties. The first step in raising such a disabled vehicle by the use of the dolly 10 of this invention is to place the cross bars 12 and 14 beneath the portion of the vehicle to be supported. This usually includes laying the cross bars 12 and 14 closely adjacent the rear wheels 34, in such a position that the tread pads are adjacent the wheels 34. In view of the fact that the cross bars 12 and 14 are of low height, they may be placed under a disabled vehicle having minimum of clearance.

After being placed in location, the locking shoes 54 and 56 are positioned in the end frames 16 and 18 in the manner shown in FIG. 5 so that a rectangular frame is now established around the wheels 34 of the disabled vehicle. This situation is shown in FIG. 6, and the next step is to install a standard bumper jack 78 in such a position as to engage in one or the other of the jacking lugs 64 or 66, in this case lug 66 as shown in FIG. 6. As indicated in FIG. 7, the next step is to raise the jack 78 in order to raise the jacking lug 66 with which it is engaged and all of the parts associated therewith. When raising is accomplished to sufficient distance as shown in FIG. 7, the wheel assemblies 24 and 26 are installed in end frames 18 by placing the square axle 72 into the square axle bearing 70 within the end frame 18. After the wheels are appropriately installed, and the cotter keys 76 placed through the axle holes 74 to secure the axles 72 in place, the jack 78 is lowered to place the weight of this side of the dolly 10 upon the wheel assemblies 24 and 26. It is to be noted that through the raising operation and after the installation of the wheel assemblies, a moment applied to the end frame 18 which causes locking of the end frame upon the locking shoes so that a rigid structure results.

After removal of the jack 78 from support of the jacking lug 66, the jack is moved to the other side of the dolly and is engaged with jacking lug 64 of end frame 16. As is seen in FIG. 8, after raising the end frame 16 and the associated ends of cross bars 12 and 14, wheels 20 and 22 are installed in end frame 16 as has been described with respect to end frame 18. Thereupon, jack 78 is lowered and the dolly is in suitable position to transport the supported end of the disabled automotive vehicle.

From the above description of the preferred embodiment of this invention, it is clear that it is capable of numerous embodiments and modifications within the scope of the routine engineer without the exercise of the inventive facility. For example, the jack 78 could be formed integrally or partially integrally with end frames 16 and 18. Furthermore, while the most desirable design of the locking shoes and end frames is disclosed, it is clear that numerous modifications thereof are feasible. Accordingly it is the desire that the scope of this invention be defined by the scope of the following claims.

I claim:

1. A dolly adapted for the support and conveyance of a disabled automotive vehicle, said dolly comprising a plurality of cross bars adapted to engage substantially beneath the automotive vehicle, said cross bars having ends, a locking shoe secured to each end of each of said cross bars, first and second end frames disconnectably mounted on the ends of said cross bars so that said locking shoe on one end of each of said cross bars engages said first end frame while said locking shoe on the other end of each of said cross bars engages said second end frame, wheel assemblies demountably supporting said end frames and means on each of said end frames for raising said end frames.

2. The dolly of claim 1 wherein said means to raise said end frames comprises jacking means on each of said end frames, said jacking means being positioned so that jacking thereof causes locking of said shoes on said cross bars into said end frames.

3. The structure of claim 2 wherein said wheel assemblies are demountable from said end frames, each of said wheel assemblies including an axle and each of said end frames having means to retain said axle, whereby said wheel assemblies may be demountably attached to said end frames.

4. The structure of claim 3 wherein said axles are square and said means to retain said axles comprises square holes in said end frames, said square axles and said holes being defined by planes intersecting at corners, one of said corners being positioned upward in said dolly.

5. A dolly adapted for the support and transportation of a disabled automotive vehicle, said dolly comprising cross bars, end frames and wheel assemblies;

said cross bars comprising tubular telescoping bars for adjustability for the total overall length of said bars, a tread pad attached to each of said bars adjacent the end thereof, and a locking shoe secured to said cross bars at the end thereof;

said end frames comprising locking means for detachably locking said locking shoes, jacking means on said end frames to permit raising of said end frames together with said cross bars locked thereto by means of said locking shoes, and wheel assembly mounting means;

said wheel assemblies including a wheel and an axle secured thereto, said axle being detachably mounted on said mounting means in said end frame, whereby the dolly is adapted to be assembled beneath said disabled automotive vehicle and raised therebelow for the raising and support of the disabled automotive vehicle.

6. A dolly adapted for the support and conveyance of a disabled automotive vehicle, said dolly comprising a plurality of cross bars adapted to engage substantially beneath the automotive vehicle, said cross bars having ends, a locking shoe secured to each end of each of said cross bars, each of said locking shoes being of substantially rectangular configuration, first and second end frames, a recess formed in each of said end frames, said recess being of substantially rectangular configuration and having a locking lip therein, said locking shoe on one end of each of said cross bars engaging in said recess in said first end frame and said locking shoe on the other end of each of said cross bars engaging in said recess in said second end frame, said locking shoes being positioned within said recess behind said locking lip so that downward load on said cross bars causes locking of said locking shoes within said end frames, wheel assemblies demountably supporting said end frames and means on each of said end frames for raising said end frames.

References Cited by the Examiner

UNITED STATES PATENTS

| | | | |
|---|---|---|---|
| 2,519,113 | 8/50 | Cohn | 280—34 |
| 2,545,440 | 3/51 | Barber | 214—331 |
| 2,796,266 | 6/57 | Sells | 280—34 X |
| 2,943,863 | 7/60 | Corey et al. | 280—35 X |
| 3,119,502 | 1/64 | Paul | 214—331 X |

ARTHUR L. LA POINT, *Primary Examiner.*